(12) United States Patent
Condaminet et al.

(10) Patent No.: US 12,537,414 B2
(45) Date of Patent: Jan. 27, 2026

(54) BRUSHLESS GEAR MOTOR WITH PLASTIC INSULATION PARTS ON CORE ENDS WITH PROTRUDING PARTS HAVING CUT CORNERS

(71) Applicant: INTEVA PRODUCTS, LLC, Troy, MI (US)

(72) Inventors: Vincent Condaminet, Donnay (FR); Alain Jeusset, Amaye sur Orne (FR)

(73) Assignee: INTEVA PRODUCTS, LLC, Troy, MI (US)

( * ) Notice: Subject to any disclaimer, the term of this patent is extended or adjusted under 35 U.S.C. 154(b) by 428 days.

(21) Appl. No.: 17/512,094

(22) Filed: Oct. 27, 2021

(65) Prior Publication Data

US 2022/0140689 A1     May 5, 2022

(30) Foreign Application Priority Data

Oct. 30, 2020  (FR) ...................................... 2011135

(51) Int. Cl.
  *H02K 5/16*   (2006.01)
  *H02K 5/167*  (2006.01)
  *H02K 7/08*   (2006.01)

(52) U.S. Cl.
  CPC .......... *H02K 5/1675* (2013.01); *H02K 7/081* (2013.01)

(58) Field of Classification Search
  CPC ........ H02K 3/345; H02K 3/34; H02K 5/1675; H02K 5/15; H02K 5/167; H02K 2203/12; H02K 7/081
  USPC .................................. 310/90, 90.5, 215, 214
  See application file for complete search history.

(56) References Cited

U.S. PATENT DOCUMENTS

| | | | | |
|---|---|---|---|---|
| 4,818,911 A | * | 4/1989 | Taguchi | H02K 3/522 310/90 |
| 6,072,261 A | * | 6/2000 | Lin | H02K 11/33 310/90 |
| 6,376,946 B1 | * | 4/2002 | Lee | H02K 5/1675 310/90 |
| 6,654,213 B2 | * | 11/2003 | Horng | H02K 1/187 310/67 R |
| 7,120,985 B2 | * | 10/2006 | Nouzumi | H02K 1/148 29/598 |
| 7,262,540 B2 | * | 8/2007 | Lee | H02K 1/148 310/194 |

(Continued)

FOREIGN PATENT DOCUMENTS

| | | |
|---|---|---|
| CN | 101056017 A | 10/2007 |
| CN | 102130520 A | 7/2011 |

(Continued)

OTHER PUBLICATIONS

WO-2016017030-A1 English Translation (Year: 2016).*

(Continued)

*Primary Examiner* — Maged M Almawri
(74) *Attorney, Agent, or Firm* — CANTOR COLBURN LLP

(57) ABSTRACT

A stator assembly for use with a brushless geared motor assembly, including: two plastic parts located on each end of a core of the stator assembly, at least one of the plastic parts including several protruding parts configured to fit into complementary slots of the stator core, wherein the protruding parts are cut at corners in order to provide flexibility to the protruding parts.

15 Claims, 8 Drawing Sheets

(56) References Cited

U.S. PATENT DOCUMENTS

| | | | | |
|---|---|---|---|---|
| 7,385,323 | B2* | 6/2008 | Takahashi | H02K 3/522 |
| | | | | 310/260 |
| 7,965,012 | B2* | 6/2011 | Murakami | H02K 3/522 |
| | | | | 310/194 |
| 8,143,756 | B2* | 3/2012 | Yuan | H02K 1/187 |
| | | | | 310/90 |
| 8,450,898 | B2* | 5/2013 | Sears | H02K 3/522 |
| | | | | 310/194 |
| 8,482,172 | B2* | 7/2013 | Sasaki | H02K 3/522 |
| | | | | 310/43 |
| 8,598,764 | B2* | 12/2013 | Horng | H02K 3/34 |
| | | | | 310/194 |
| 8,941,274 | B2* | 1/2015 | Gianni | H02K 1/148 |
| | | | | 310/216.013 |
| 9,331,530 | B2* | 5/2016 | Jang | H02K 1/146 |
| 9,461,515 | B2* | 10/2016 | Furukawa | H02K 3/487 |
| 9,876,399 | B2* | 1/2018 | Aumann | H02K 1/165 |
| 10,218,239 | B2* | 2/2019 | Li | H02K 3/522 |
| 10,547,224 | B2* | 1/2020 | Hattori | H02K 3/345 |
| 10,547,225 | B2* | 1/2020 | Hattori | H02K 1/185 |
| 11,355,983 | B2* | 6/2022 | Naito | H02K 7/145 |
| 11,398,760 | B2* | 7/2022 | Natsumeda | H02K 3/522 |
| 2003/0156366 | A1* | 8/2003 | Horng | H02K 1/187 |
| | | | | 361/23 |
| 2004/0119350 | A1* | 6/2004 | Miya | H02K 3/522 |
| | | | | 310/71 |
| 2005/0189837 | A1* | 9/2005 | Lee | H02K 3/522 |
| | | | | 310/215 |
| 2006/0022545 | A1* | 2/2006 | Hashiba | H02K 21/222 |
| | | | | 310/179 |
| 2007/0194653 | A1* | 8/2007 | Prokscha | H02K 3/522 |
| | | | | 310/216.023 |
| 2008/0116761 | A1* | 5/2008 | Lin | H02K 3/522 |
| | | | | 310/257 |
| 2009/0026873 | A1* | 1/2009 | Matsuo | H02K 15/022 |
| | | | | 310/216.019 |
| 2009/0324435 | A1* | 12/2009 | Sears | H02K 3/522 |
| | | | | 310/215 |
| 2010/0026117 | A1* | 2/2010 | Sakata | F04C 11/008 |
| | | | | 310/85 |
| 2010/0264757 | A1* | 10/2010 | Asou | H02K 3/38 |
| | | | | 310/43 |
| 2011/0109189 | A1* | 5/2011 | Taema | H02K 15/095 |
| | | | | 310/215 |
| 2012/0038230 | A1* | 2/2012 | Kurahara | H02K 3/38 |
| | | | | 310/71 |
| 2012/0080973 | A1* | 4/2012 | Furukawa | H02K 1/24 |
| | | | | 29/598 |
| 2012/0194028 | A1* | 8/2012 | Rhoads | H02K 3/34 |
| | | | | 310/215 |
| 2013/0020901 | A1* | 1/2013 | Kishi | H02K 15/0081 |
| | | | | 310/215 |
| 2013/0140936 | A1* | 6/2013 | Lin | H02K 3/325 |
| | | | | 310/215 |
| 2013/0154435 | A1* | 6/2013 | Nakatake | H02K 1/08 |
| | | | | 310/216.061 |
| 2014/0203681 | A1* | 7/2014 | Xiang | H02K 1/165 |
| | | | | 310/216.001 |
| 2015/0069878 | A1* | 3/2015 | Hattori | H02K 1/146 |
| | | | | 310/216.061 |
| 2017/0126090 | A1* | 5/2017 | Chen | H02K 3/522 |
| 2020/0031207 | A1 | 1/2020 | Henes | |
| 2020/0195076 | A1* | 6/2020 | Naito | H02K 3/12 |
| 2020/0195180 | A1 | 6/2020 | Li et al. | |

FOREIGN PATENT DOCUMENTS

| | | | | |
|---|---|---|---|---|
| CN | 210867303 U | 6/2020 | | |
| DE | 102019131670 A1 | 6/2020 | | |
| EP | 1936778 A2 | 6/2008 | | |
| WO | WO-2016017030 A1 * | 2/2016 | | H02K 3/325 |
| WO | WO-2016047033 A1 * | 6/2016 | | H02K 3/34 |

OTHER PUBLICATIONS

French Search Report and Written Opinion for France Application No. 2011135; Application Filing Date: Oct. 30, 2020; Date of Search: Jul. 16, 2021; 10 pages.

Notification of the First Notice to Make Rectification in Chinese for Application No. 202122616757.1 Issued Mar. 18, 2022; 1 Page.

Office Action issued in Chinese Patent Application No. 202111263482.6; Application Filing Date Oct. 28, 2021; Date of Mailing Dec. 21, 2024 (18 pages).

CNIPA Notification of the Second Office Action corresponding to CN Application No. 202111263482.6; Issue date, Aug. 13, 2025, 18 pages.

* cited by examiner

BRUSHLESS GEAR MOTOR WITH PLASTIC INSULATION PARTS ON CORE ENDS WITH PROTRUDING PARTS HAVING CUT CORNERS

CROSS REFERENCE TO RELATED APPLICATIONS

This application claims priority under 35 U.S.C. § 119 to the following French Patent Application No. FR 20/11135, filed on Oct. 30, 2020, the entire contents of which are incorporated herein by reference thereto.

BACKGROUND

Exemplary embodiments pertain to the art of brushless gear motor assemblies and stator assemblies for brushless gear motors.

Brushless gear motor assemblies allow for the elimination of the brush commutation noise that appears with conventional DC motors.

To electrically connect the terminals to an electronic control board, one must either: solder the electrical wires at each end, or use an intermediate phase connector part.

The present disclosure offers the advantage of not requiring any intermediate part or the soldering of electrical wires to connect the 3 phases of the motor to the electronic control board.

Having bearings on an electric motor that are too far from the "magnetic core" creates problems of concentricity between the rotor and stator axes, which generally leads to tight tolerances on the parts to avoid friction of the magnets against the steel lamination stack. The present disclosure provides that a bearing holder that is directly guided and therefore well positioned on the stator in order to establish a proper centering and alignment of the rotor within the stator.

The assembling of the insulator parts on each side of the stator core may be difficult and require extreme precision. The present disclosure also provides a solution to simplify the assembling process.

BRIEF DESCRIPTION

Disclosed is a stator assembly for use with a brushless geared motor assembly, including: two plastic parts located on each end of a core of the stator assembly, at least one of the plastic parts including several protruding parts configured to fit into complementary slots of the stator core, wherein the protruding parts are cut at corners in order to provide flexibility to the protruding parts.

In addition to one or more of the features described above, or as an alternative to any of the foregoing embodiments, the protruding parts are also chamfered to allow for ease of insertion into the stator core.

In addition to one or more of the features described above, or as an alternative to any of the foregoing embodiments, in-slot walls of the stator assembly are partly or fully covered with a thin layer of plastic material which prevents windings of the stator assembly from shorting.

In addition to one or more of the features described above, or as an alternative to any of the foregoing embodiments, at least one of the plastic parts has two diametrically opposed notches that receive tabs of a central bearing holder when the central bearing holder is secured to the stator assembly.

In addition to one or more of the features described above, or as an alternative to any of the foregoing embodiments, a spherical bearing is overmolded on the central bearing holder.

In addition to one or more of the features described above, or as an alternative to any of the foregoing embodiments, the central bearing holder has a ring that guides the stator assembly into a gearbox body.

In addition to one or more of the features described above, or as an alternative to any of the foregoing embodiments, one of the plastic parts has two diametrically opposed notches that receive tabs of a central bearing holder when the central bearing holder is secured to the stator assembly and the other one of the plastic parts has four notches where crimp terminals are press-fitted, three terminals for the 3 phases of the stator assembly and one terminal for a neutral point connection of the stator assembly.

In addition to one or more of the features described above, or as an alternative to any of the foregoing embodiments, the three terminals are each connected to a conductive track leading to a connector.

In addition to one or more of the features described above, or as an alternative to any of the foregoing embodiments, a spherical bearing is overmolded on the central bearing holder.

In addition to one or more of the features described above, or as an alternative to any of the foregoing embodiments, the central bearing holder has a ring that guides the stator assembly into a gearbox body.

Also disclosed is a brushless gear motor assembly including the a stator assembly, the stator assembly including: two plastic parts located on each end of a core of the stator assembly, at least one of the plastic parts including several protruding parts configured to fit into complementary slots of the stator core, wherein the protruding parts are cut at corners in order to provide flexibility to the protruding parts.

In addition to one or more of the features described above, or as an alternative to any of the foregoing embodiments, the brushless gear motor assembly includes a rotor assembly, a gearbox and an electronic control board.

In addition to one or more of the features described above, or as an alternative to any of the foregoing embodiments, an end cap part partly covers the stator assembly.

In addition to one or more of the features described above, or as an alternative to any of the foregoing embodiments, the end cap part has two or more open areas where a portion of the stator assembly is viewable such that an overall thickness of the brushless gear motor assembly is reduced.

In addition to one or more of the features described above, or as an alternative to any of the foregoing embodiments, the end cap part includes a stop and a bearing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The present disclosure relates to a brushless gear motor assembly for certain vehicle applications such as window regulator and sunroof applications. Although other applications are contemplated. Using brushless technology allows the elimination of the brush commutation noise that appears with conventional DC motors. It also allows the global product to be compact and lighter by suppressing the collector box. The present disclosure provides an optimized design regarding power/mass ratio. It also describes an assembly process for the disclosed brushless gear motor.

Figure 1:
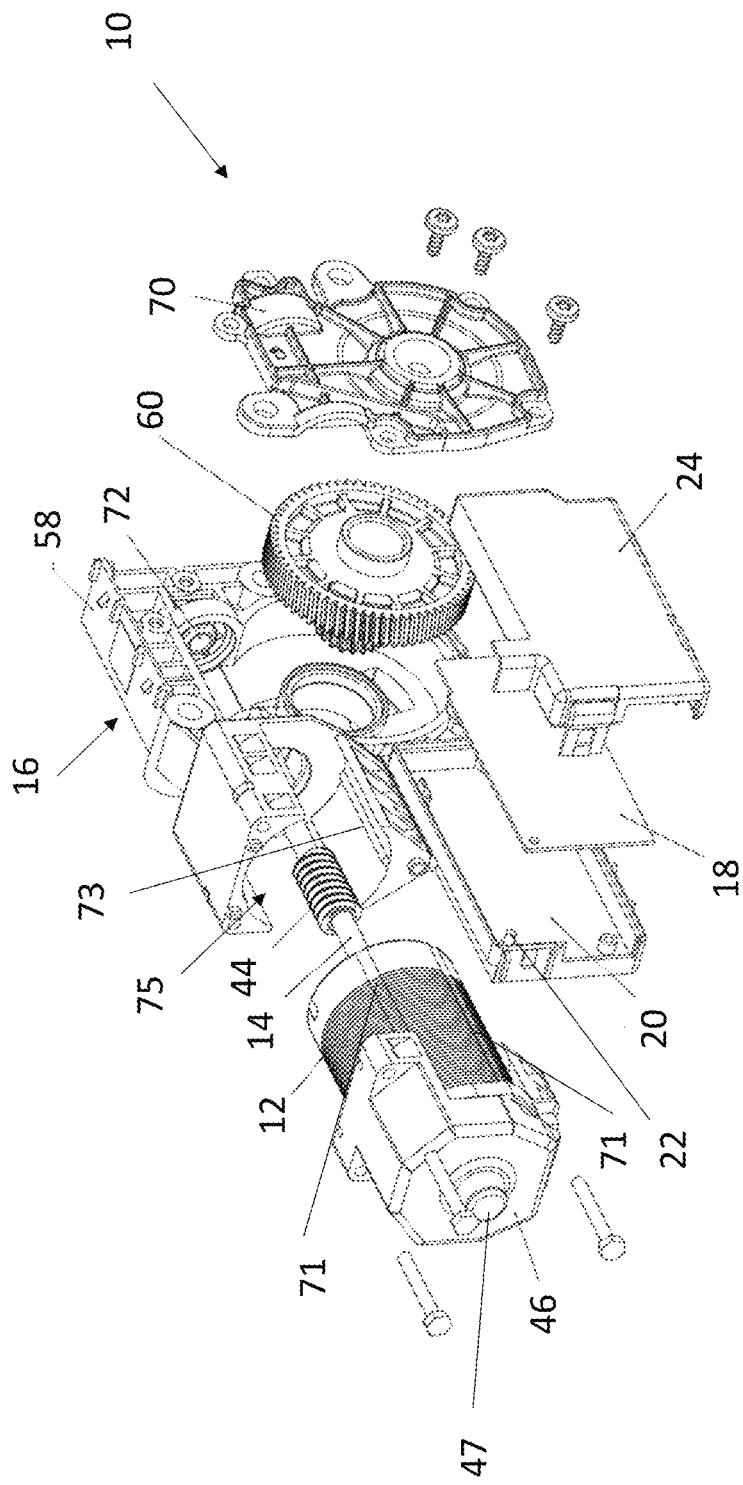
FIG. 1 is an exploded view of a brushless motor in accordance with the present disclosure.
Figure 2A:
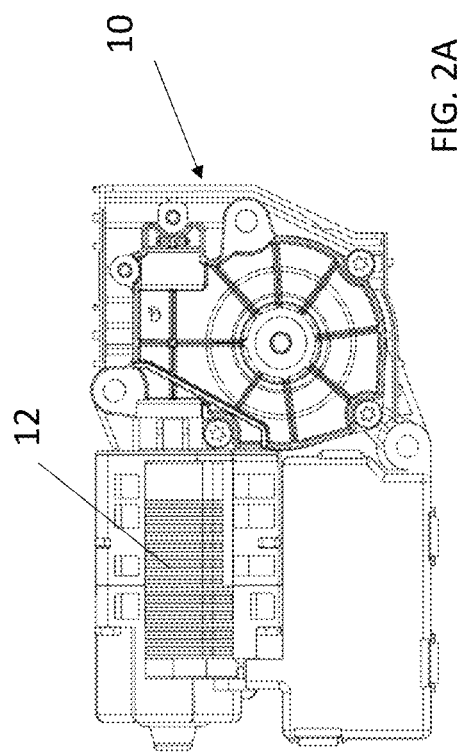
FIG. 2A is a side view of a brushless motor in accordance with the present disclosure.
Figure 2B:
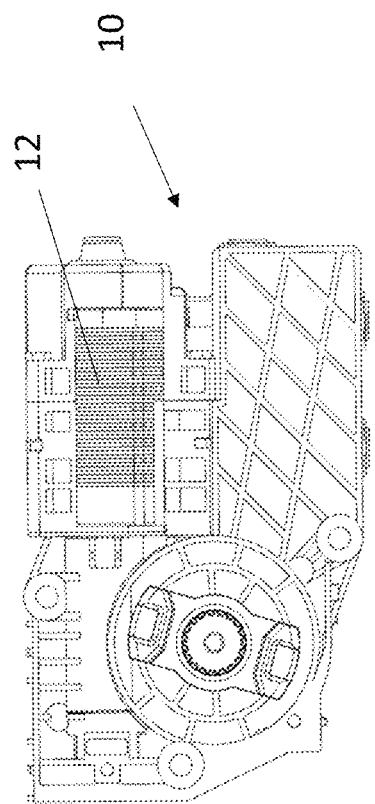
FIG. 2B is a side view of a brushless motor in accordance with the present disclosure.
Figure 3:
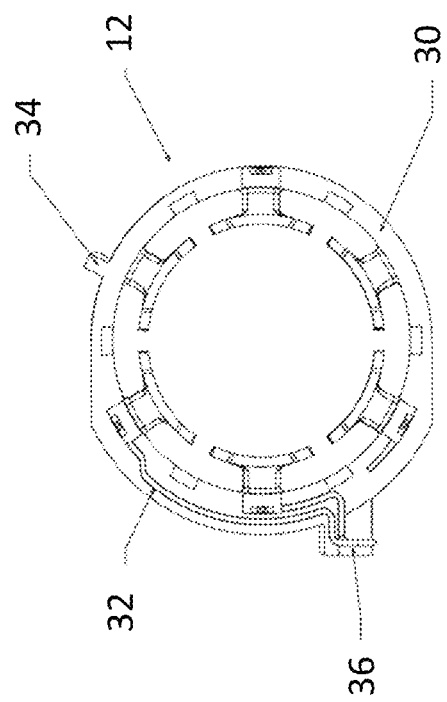
FIG. 3 is an end view of a stator assembly in accordance with the present disclosure.
Figure 4B:
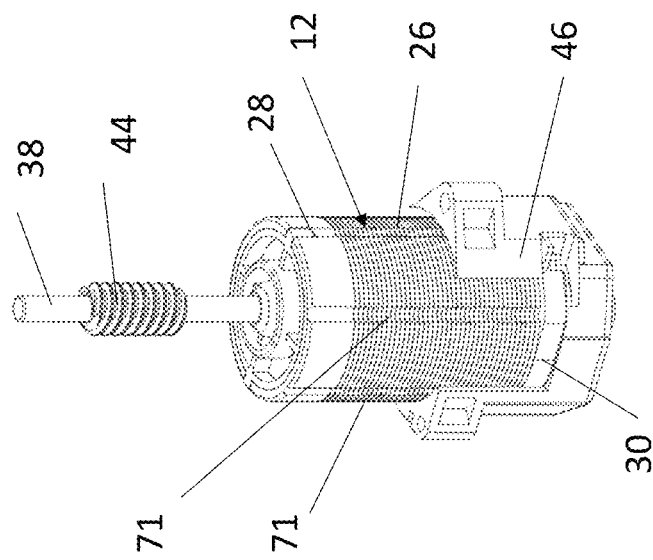
FIG. 4B is an exploded view of a stator assembly and rotor assembly in accordance with the present disclosure.
Figure 4A:
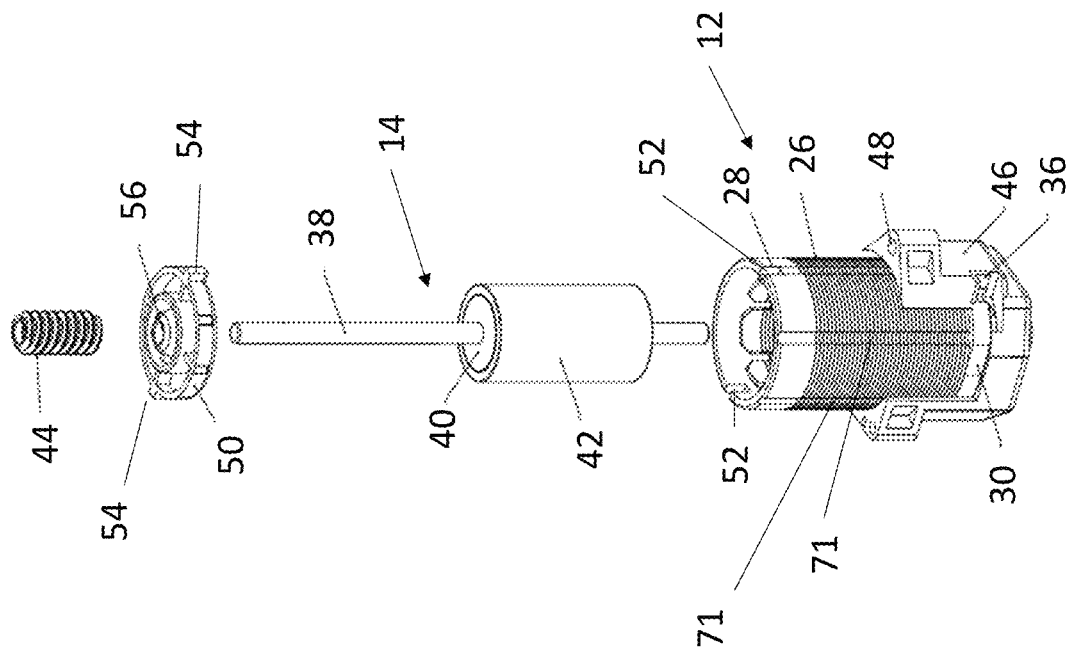
FIG. 4A is an exploded view of a stator assembly and rotor assembly in accordance with the present disclosure.

Referring now to at least FIGS. 1-4B, the present disclosure relates to a brushless gear motor assembly 10. The brushless gear motor assembly 10 includes a stator assembly or sub assembly 12 and a rotor assembly or subassembly 14, a gearbox 16 and an electronic control board 18.

The electronic control board 18 is housed into a gearbox body 20. It is guided with a cylinder 22 and locked with the help of clips. There are three main sectors on the board; the first is dedicated to an external power supply connection; the second is the electronic components region; and the third is for the connection of the 3 phases of the motor and optionally other connections related to the rotor position sensing device.

The electronic control board 18 is covered with a plastic part 24.

The stator subassembly 12 is composed of a steel lamination stack 26 and two plastic caps 28, 30. The stator has a number of arms which is a multiple of 3. The plastic caps 28 and 30 prevent wound copper wires of the arms of the stator to be cut by sharp corners. They also house conductive plugs 32 to connect the 3 phases to the electronic control board 18. The cap 30 may be referred to as an upper cap and also has two protruding parts 34 and 36 allowing the axial lock of the stator, like a bayonet mounting.

The rotor subassembly 14 is composed of a steel shaft 38, on which is mounted a steel core cylinder 40 and magnets 42. The magnets 42 can be segments or a ring mounted on a surface of the core cylinder 40. The magnets 42 may also be buried in the rotor core. A worm screw 44 is mounted on the shaft 38.

An end cap part 46 covers partly the stator assembly 12. It is long enough to hold the stator assembly 12 and has two or more open areas where the stator stack is apparent or viewable, so that the overall thickness of the motor is reduced. In other words, by reducing the width of the end cap part 46 on at least two sides so the stator stack is apparent, the overall thickness of the motor 10 is reduced. The end cap part 46 is equipped with a stop and a bearing 47, and has at least two fixing holes 48 assembly with the gearbox 16. In addition, the end cap part 46 is configured to engage the two protruding parts 34 and 36 of the cap 30 in order to allow for the axial lock of the stator, like a bayonet mounting, to the end cap part 46.

A central bearing holder 50 is fitted in and guided by the stator assembly 12 with the help of notches 52 on the insulation plastic part 28 that receive tabs or features 54. The central bearing holder 50 is also equipped with an overmolded spherical bearing 56.

The gearbox subassembly 16 includes a main casing or housing 58, a pinion wheel or gear 60, a cover 70, a stopper and a bearing 72.

The assembly process of such brushless gear motor is as follows. Once the stator arms are wound with copper coils, the stator subassembly 12 is introduced into the end cap 46 and turned into it in order to lock it in the axial direction, like a bayonet mounting. Then the rotor subassembly 14 is introduced such that the magnetic part of the rotor is neighboring the steel lamination stack 26 of the stator assembly 12. The central bearing holder 50 is consecutively introduced in order to hold the shaft 38 properly. Once the shaft 38 is correctly held, the worm screw 44 can be heated and mounted on the shaft surface. Thereafter, assembly to the gearbox 16 may occur including assembly of the covers 24 and 70 to the main casing or housing 58. During this assembly slots 71 located on the exterior of the stator assembly 12 slidably engage raised features, protrusions or elongated protrusions 73 located in a receiving area 75 of the gearbox 16. In one embodiment, at least two raised features, protrusions or elongated protrusions 73 are provided to engage complimentary slots 71 located on the external surface of the stator assembly 12. Of course, more than two raised features, protrusions or elongated protrusions 73 and complimentary slots 71 are considered to be within the scope of the present application. These features, protrusions or elongated protrusions 73 and complimentary slots 71 provide the function of aligning the three bearings located in the end cap part 46 (bearing 47), central bearing holder 50 (bearing 56) and housing 58 (bearing 72) as well as prevent the rotation of the stator assembly 12 while the motor is running.

The above described brushless gear motor assembly 10, may be used for window regulator and sunroof motor applications in vehicles although the present disclosure is not limited to only these applications.

Figure 5B:
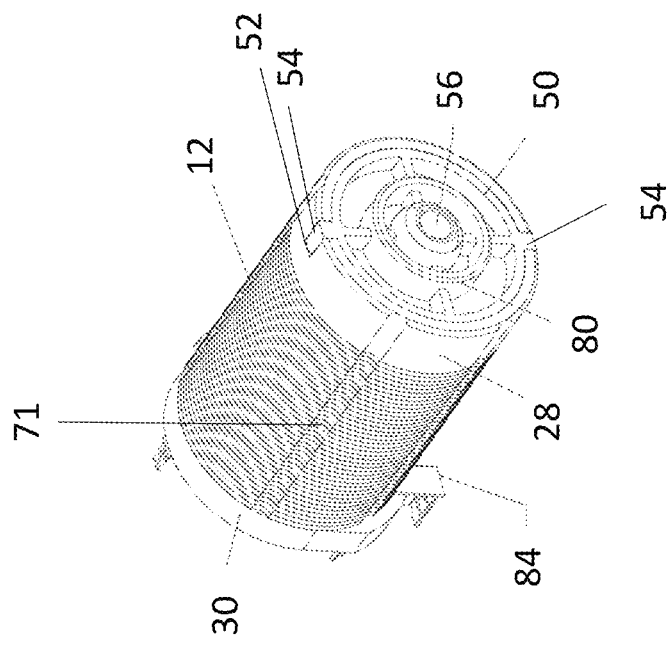
FIG. 5B is a perspective view of a stator assembly in accordance with the present disclosure.
Figure 5A:
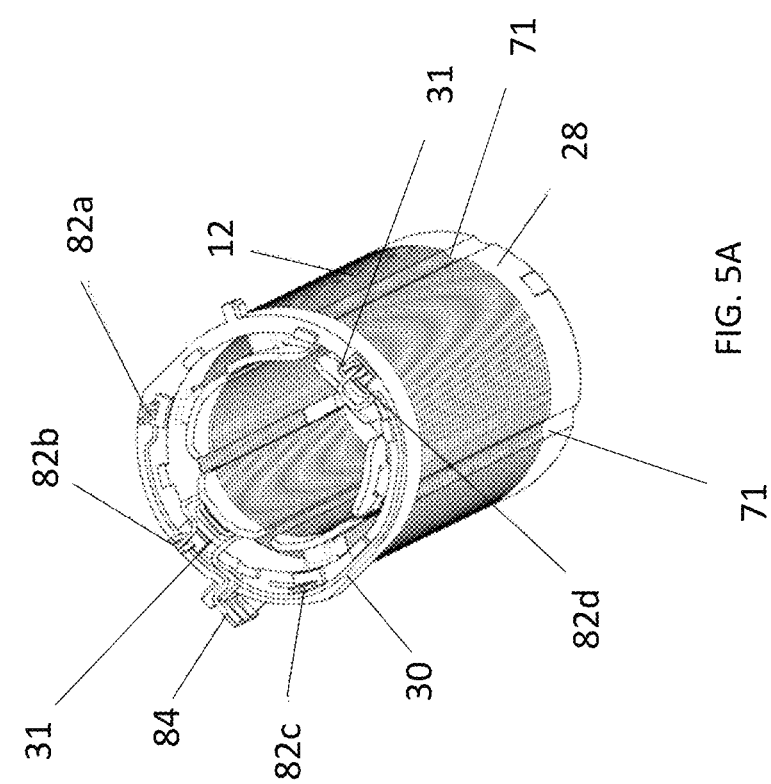
FIG. 5A is a perspective view of a stator assembly in accordance with the present disclosure.
Figure 7:
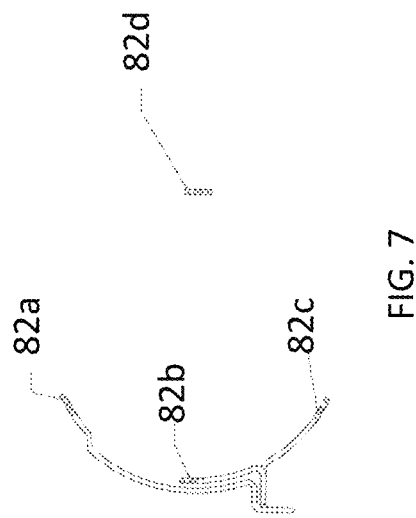
FIG. 7 is an end view of terminals for a stator assembly in accordance with the present disclosure.
Figure 6:
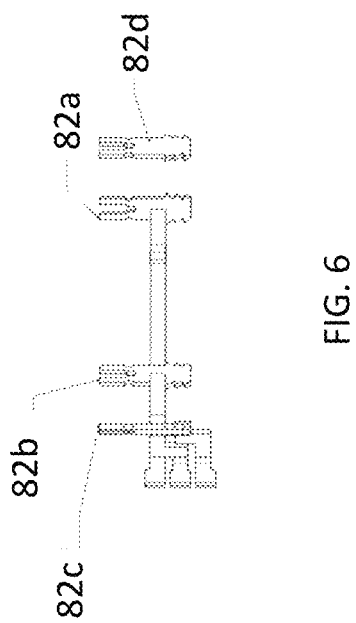
FIG. 6 is a side view of terminals for a stator assembly in accordance with the present disclosure.
Figure 9:
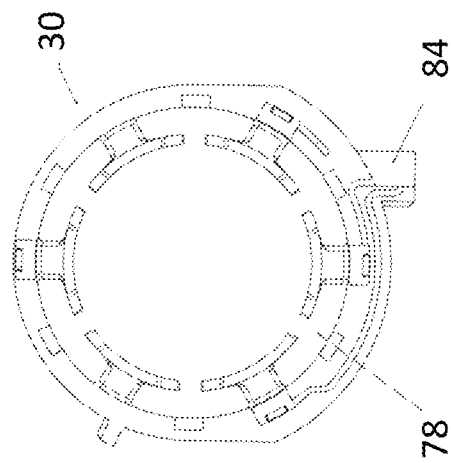
FIG. 9 is an end view of the plastic end part illustrated in FIG. 8.
Figure 10:
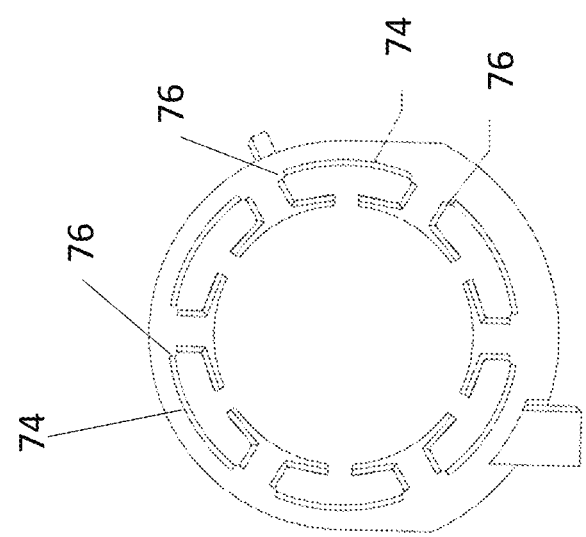
FIG. 10 is an opposite end view of the plastic end part illustrated in FIG. 9.
Figure 8:
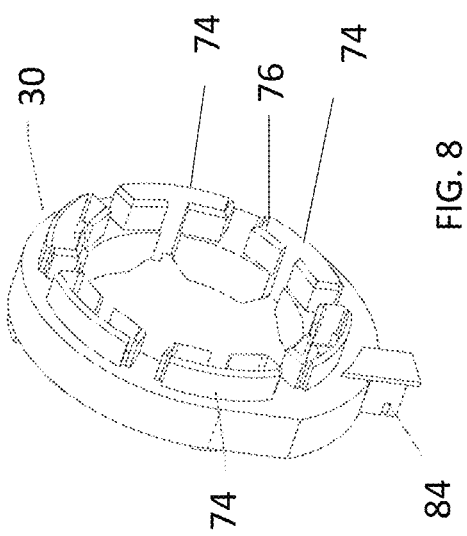
FIG. 8 is a perspective view of a plastic end part for a stator assembly in accordance with the present disclosure.
Figure 11:
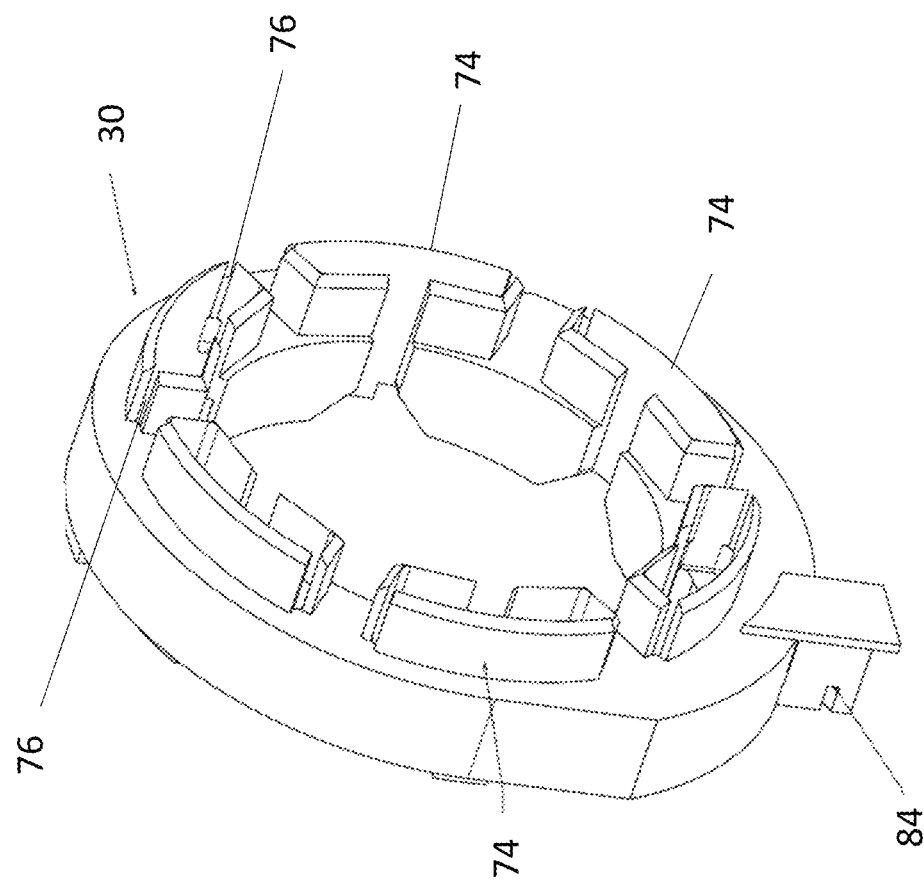
FIG. 11 is an enlarged view of FIG. 8.

Referring now to FIGS. 5A-11, the stator assembly 12 for use with the brushless geared motor assembly 10 is illustrated. As mentioned above two plastic parts or insulating parts 28 and 30 are used on each end of the core of the stator assembly to support windings 31 of the stator assembly. Note in FIG. 5A only two windings 31 of one phase of the motor are illustrated. These plastic parts provide several thin protruding parts 74 fitting into complementary slots of the stator core. Those protruding parts 74 are "cut" at corners 76, making them more flexible, they are also chamfered, all to make the assembling process with the stator core easier and more reliable. Once these parts are press-fitted on each end of the stator core, the in-slot walls of the stator core are partly or fully covered with a thin layer of plastic material 78 which prevent the stator's windings from shorting to the core.

The plastic part or insulator part 28 which is inserted into the gearbox 16 when the stator assembly 12 is secured to the gearbox 16 is slightly deeper or longer axially than the plastic part or insulating part 30 located on the opposite side of the stator assembly 12. This plastic part or insulator part 28 has two diametrically opposed notches 52 where tabs or features 54 of the central bearing holder 50 are received when the central bearing holder is secured to the stator assembly 12. As mentioned above a spherical bearing 56 is overmolded on the central bearing holder 50.

The fact that the central bearing holder 50 is guided, not by the stator case, but directly by the stator winding assembly 12, guarantees that the rotor assembly 14 is in a concentric position relative to the stator. Moreover, the proximity between the bearing and the stator allows the brushless gear motor assembly 10 to be more compact and lighter. The central bearing holder 50 may have a ring 80 or a guiding feature that guides the stator assembly into the gearbox body 58.

The opposite plastic part 30 has four notches where crimp terminals are press-fitted: three terminals for the 3 phases (82a, 82b, 82c) of the stator assembly and one terminal for the neutral point connection (82d) of the stator assembly. The phase terminals are each connected to a conductive track leading to a connector 84. The conductive tracks are preferably press-fitted in the plastic part 30 and not overmolded, in order to make the assembling process easier and less expensive.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates to one or more structural limitations of a device that are required for the device to perform the function or operation for which the device is configured.

The disclosure illustratively disclosed herein may be practiced in the absence of any element which is not specifically disclosed herein.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A stator assembly for use with a brushless geared motor assembly, comprising:
   two plastic parts located on each end of a core of the stator assembly, at least one of the plastic parts including several protruding parts that each define a portion of a wall of a perimeter configured to fit into complementary slots of the stator core, wherein some of the protruding parts defining portions of the wall of the perimeter are completely spaced from each other at corners such that a gap is provided at the corners in order to provide flexibility to the protruding parts.

2. The stator assembly as in claim 1, wherein the protruding parts are also chamfered along a distal end to allow for ease of insertion into the stator core.

3. The stator assembly as in claim 1, wherein in-slot walls of the stator assembly are partly or fully covered with a thin layer of plastic material which prevents windings of the stator assembly from shorting.

4. The stator assembly as in claim 1, wherein at least one of the plastic parts has two diametrically opposed notches that receive tabs of a central bearing holder when the central bearing holder is secured to the stator assembly.

5. The stator assembly as in claim 4, wherein a spherical bearing is overmolded on the central bearing holder.

6. The stator assembly as in claim 5, wherein the central bearing holder has a ring that guides the stator assembly into a gearbox body.

7. The stator assembly as in claim 1, wherein one of the plastic parts has two diametrically opposed notches that receive tabs of a central bearing holder when the central bearing holder is secured to the stator assembly and the other one of the plastic parts has four notches where crimp terminals are press-fitted, three terminals for the 3 phases of the stator assembly and one terminal for a neutral point connection of the stator assembly.

8. The stator assembly as in claim 7, wherein the three terminals are each connected to a conductive track leading to a connector.

9. The stator assembly as in claim 8, wherein a spherical bearing is overmolded on the central bearing holder.

10. The stator assembly as in claim 9, wherein the central bearing holder has a ring that guides the stator assembly into a gearbox body.

11. A brushless gear motor assembly including the stator assembly according to claim 1.

12. The brushless gear motor assembly as in claim 11, wherein the brushless gear motor assembly includes a rotor assembly, a gearbox and an electronic control board.

13. The brushless gear motor assembly as in claim 11, wherein an end cap part partly covers the stator assembly.

14. The brushless gear motor assembly as in claim 13, wherein the end cap part has two or more open areas where a portion of the stator assembly is viewable such that an overall thickness of the brushless gear motor assembly is reduced.

15. The brushless gear motor assembly as in claim 14, wherein the end cap part includes a stop and a bearing.

* * * * *